Figure 1:
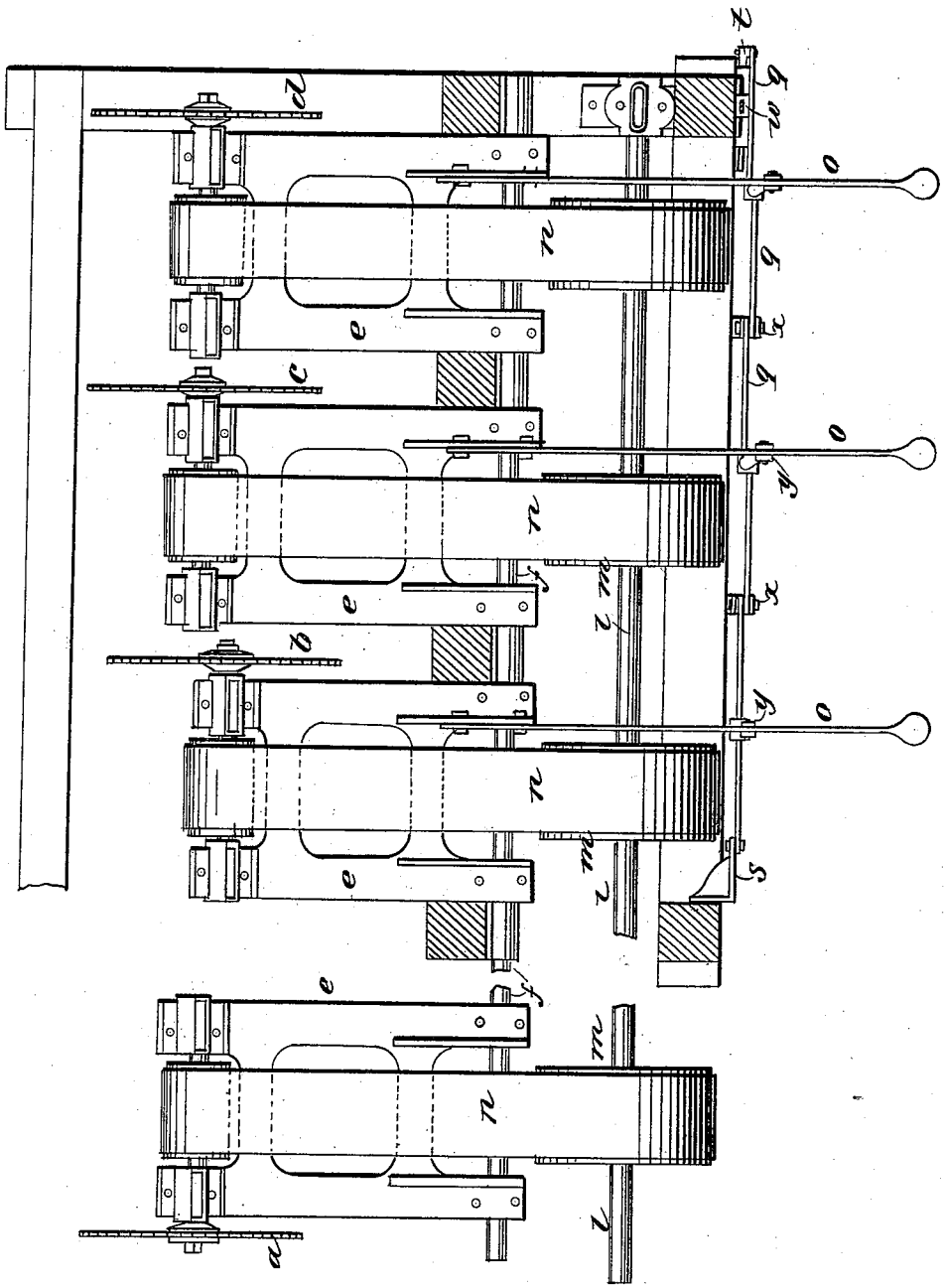

(No Model.)  2 Sheets—Sheet 1.

E. HEYDE.
LUMBER TRIMMING MACHINE.

No. 297,395.  Patented Apr. 22, 1884.

WITNESSES:
Francis McArdle
C. Sedgwick

INVENTOR:
E. Heyde
BY Munn & Co
ATTORNEYS.

(No Model.) 2 Sheets—Sheet 2.
E. HEYDE.
LUMBER TRIMMING MACHINE.
No. 297,395. Patented Apr. 22, 1884.
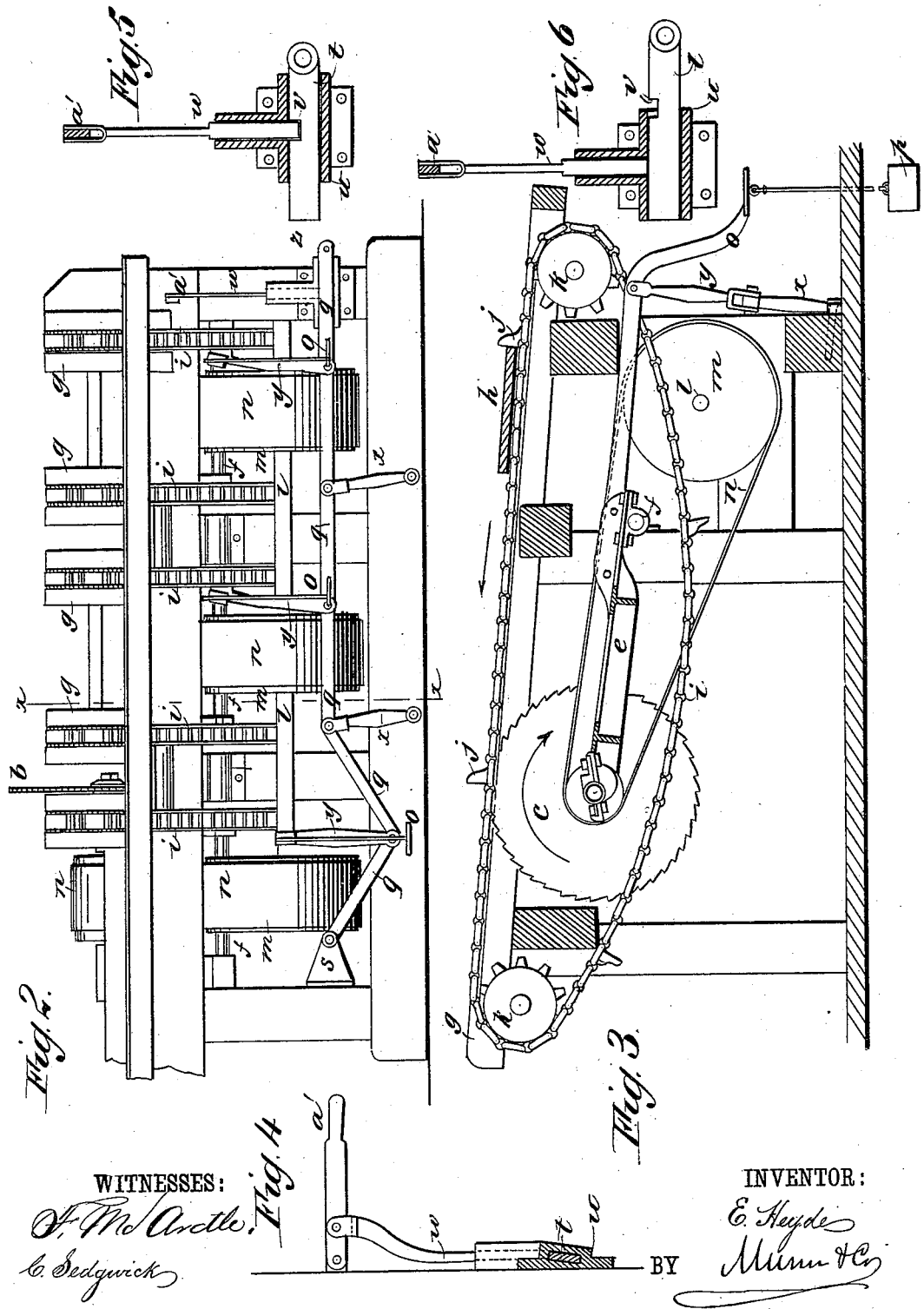
WITNESSES:
F. McArdle
C. Sedgwick
INVENTOR:
E. Heyde
BY Munn & Co
ATTORNEYS.

UNITED STATES PATENT OFFICE.

EDWARD HEYDE, OF EAST SAGINAW, MICHIGAN.

LUMBER-TRIMMING MACHINE.

SPECIFICATION forming part of Letters Patent No. 297,395, dated April 22, 1884.

Application filed January 21, 1884. (No model.)

*To all whom it may concern:*

Be it known that I, EDWARD HEYDE, of East Saginaw, in the county of Saginaw and State of Michigan, have invented a new and Improved Lumber-Trimming Machine, of which the following is a full, clear, and exact description.

My invention consists of an improved contrivance of apparatus for raising up and holding in position any one of a series of cutting-off saws arranged in a bench over which boards are carried sidewise by endless chains to have the ends trimmed square and to specified lengths, the saws being arranged in the bench at certain specified distances apart for trimming to several different standard lengths of boards, all as hereinafter fully described.

Reference is to be had to the accompanying drawings, forming a part of this specification, in which similar letters of reference indicate corresponding parts in all the figures.

Figure 1 is a horizontal section of a trimming-machine with saws arranged for trimming to three different lengths of lumber, and having my improved contrivance for raising and holding up the saws to be used. Fig. 2 is a side elevation of part of said machine with my improved contrivances applied. Fig. 3 is a transverse sectional elevation. Figs. 4, 5, and 6 are details of a locking device to hold up any one of the saws suitably for trimming off the ends of the boards passing along over the top of the frame, and also holding the other saws of the series out of the working position.

The machine consists, essentially, of a series of circular cutting-off saws, $a$, $b$, $c$, and $d$, (more or less, as preferred,) arranged on vertically-swinging frames $e$, pivoted on a shaft, $f$, so that any one of the saws can be raised up higher at its upper edge than the ways $g$, on the top of the table or frame of the machine, to trim off the ends of boards $h$, which are carried along past the saws by endless chains $i$, having pusher-lugs $j$, and running over chain-carrying wheels $k$ and between the ways $g$. The saws are mounted on independent frames $e$, but are driven from one shaft, $l$, by a driving-pulley, $m$, and belt $n$ for each saw. The saw $a$ is to be held up in the working position for trimming one end of boards of any lengths; but the other saws are only to be held up in said position for boards of the special lengths for which they are placed; and when any one of these saws is to be elevated, the others are to remain below the ways $g$. The frames of these saws $b$, $c$, and $d$ each have a foot-lever, $o$, connected to them, and extending backward therefrom beyond the side of the frame of the machine suitably for being pressed down by the foot to raise up the saw, and the saw-frames are nearly counterbalanced by a weight, $p$, so as to require but little force to raise them up, and also to hold them up when raised.

It is desirable to hold up one of the saws and keep down the rest of the series, $b$ $c$ $d$, while running lumber of a particular length, and to change readily from one saw to another when lumber of a different length is to be passed. I have therefore connected the series of foot-levers $o$, belonging to the frames of these saws, by rods $y$, to a chain of links, $q$, which is jointed at one end to a fixed support, $s$, and is connected at the other end to a sliding bar, $t$, arranged to slide forward and backward in a socket, $u$, and having a notch, $v$, with a slide latch-bolt, $w$, to drop into said notch and hold said bar in a fixed position. The chain has two links, $q$, between each lever $o$, and one link each between the end connections and the levers next thereto, and at the joints of the two links between the levers said links are jointed to the vibrating strut-supports $x$, which hold up said joints level with the end connections of the chain, and also level with the positions of the lower ends of rods $y$, when the saws are dropped below the said table, said rods being connected to the chain at the joints between those joints of said chain that are connected to supports. When any one of the saws $b$, $c$, or $d$ is raised up to the working position by depressing its lever $o$, the depression of the chain will draw the slide-bar $t$, so that the latch-bolt $w$ will drop into notch $v$ and lock it in such position that the chain will be maintained in the depressed position by the thrust of the chain, said chain being supported at the joints connected to struts $x$ by them, and at the joints connected with rods $y$ by the upward pull of the levers $o$, due to the leverage of the saw-frames connected to them. When the slide $t$ is thus locked in the working position, pressing down any one of the foot-levers o to bring up any saw will force down any other saw of the series that may be up at the time, thus enabling the change from one saw to another to be readily effected merely by pressing down the lever of the saw that is wanted to be raised.

When the saws of the series b c d are to be let down out of use, the latch w is raised out of the notch of the slide, which will then be pushed along to the position of Fig. 6 by the dropping of the raised saw. The latch w has a hand-lever, a', connected to it for raising it up readily whenever the chain is to be released for enabling any one of the saws to drop down from its working position without raising another.

It will be seen that this simple chain device will economize considerably in the labor and time of adjusting the saws and changing them when such changes are frequently required.

Having thus fully described my invention, I claim as new and desire to secure by Letters Patent—

1. The combination, with a series of trimming-saws mounted on swinging frames for use of one only at a time in the working position, of the chain q, the joints of which are connected alternately with the levers of said swinging frames, and joint-supports for said chain, said joint-supports consisting of the vibrating struts x between the levers, permanent support s at one end and the slide-bar t at the other end of said chain, and said slide-bar having a notch, v, and a latch-bolt, w, to set said slide-support either for maintaining one of the saws in the working position or all of them out of said working position, substantially as described.

2. The combination of a series of counterbalanced pivoted saw-frames, having trimming-saws at their inner ends and foot-levers o at their outer ends, with the chain-links q, connected to said foot-levers by rods y, pivoted thereto, and to struts x, pivoted to the frame below said rods, the said chain-links being connected to the frame at one end by a fixed support, s, and provided at the opposite end with a notched slide, t, working in the casing u, a stop-latch, w, also working in said casing at right angles to the slide t, for engaging said slide, and a lever, a', connected to said stop-latch for operating the same, substantially as set forth.

EDWARD HEYDE.

Witnesses:
  A. GOLDIE,
  CLARENCE L. EASTMAN.